United States Patent [19]

Wurst

[11] 4,021,618
[45] May 3, 1977

[54] INTRA LINK CALLING WITHIN A SUBSCRIBER DIGITAL SYSTEM

[75] Inventor: Walter Kenneth Wurst, Guelph, Canada

[73] Assignee: International Standard Electric Corporation, New York, N.Y.

[22] Filed: Apr. 28, 1975

[21] Appl. No.: 572,398

[52] U.S. Cl. .......................................... 179/18 FC
[51] Int. Cl.² ........................................ H04Q 3/60
[58] Field of Search ............................. 179/18 FC

[56] References Cited

UNITED STATES PATENTS

| | | | |
|---|---|---|---|
| 3,311,705 | 3/1967 | LeCorre et al. | 179/15 AT |
| 3,462,557 | 8/1969 | Brooks et al. | 179/18 FC |
| 3,496,301 | 2/1970 | Kaenel | 179/18 FC X |
| 3,778,555 | 12/1973 | Nordling et al. | 179/18 FC |

Primary Examiner—Thomas W. Brown
Attorney, Agent, or Firm—J. B. Raden; M. M. Chaban

[57] ABSTRACT

Disclosed is a feature for use in a subscriber digital multiplexer interfacing between a central telecommunications office (CO) and a plurality of remote terminals, each remote terminal serving a number of subscribers. Calls from and to lines at the same remote terminal are identified over a special network at the central office for the purpose of by-passing the speech channels to the central office and thereby freeing the central office equipment and two channels for use in processing other calls. The special network or intra link network is activated after the called station has responded to a call. First, a check is made to see whether a station at the same remote terminal has originated a call. A tone is then sent out over the line to determine whether the call originated and terminated at the same remote terminal. If both lines are from the same remote terminal, the call is transferred from the speech channels to intra link channels as controlled at the central office over signalling channels.

8 Claims, 19 Drawing Figures

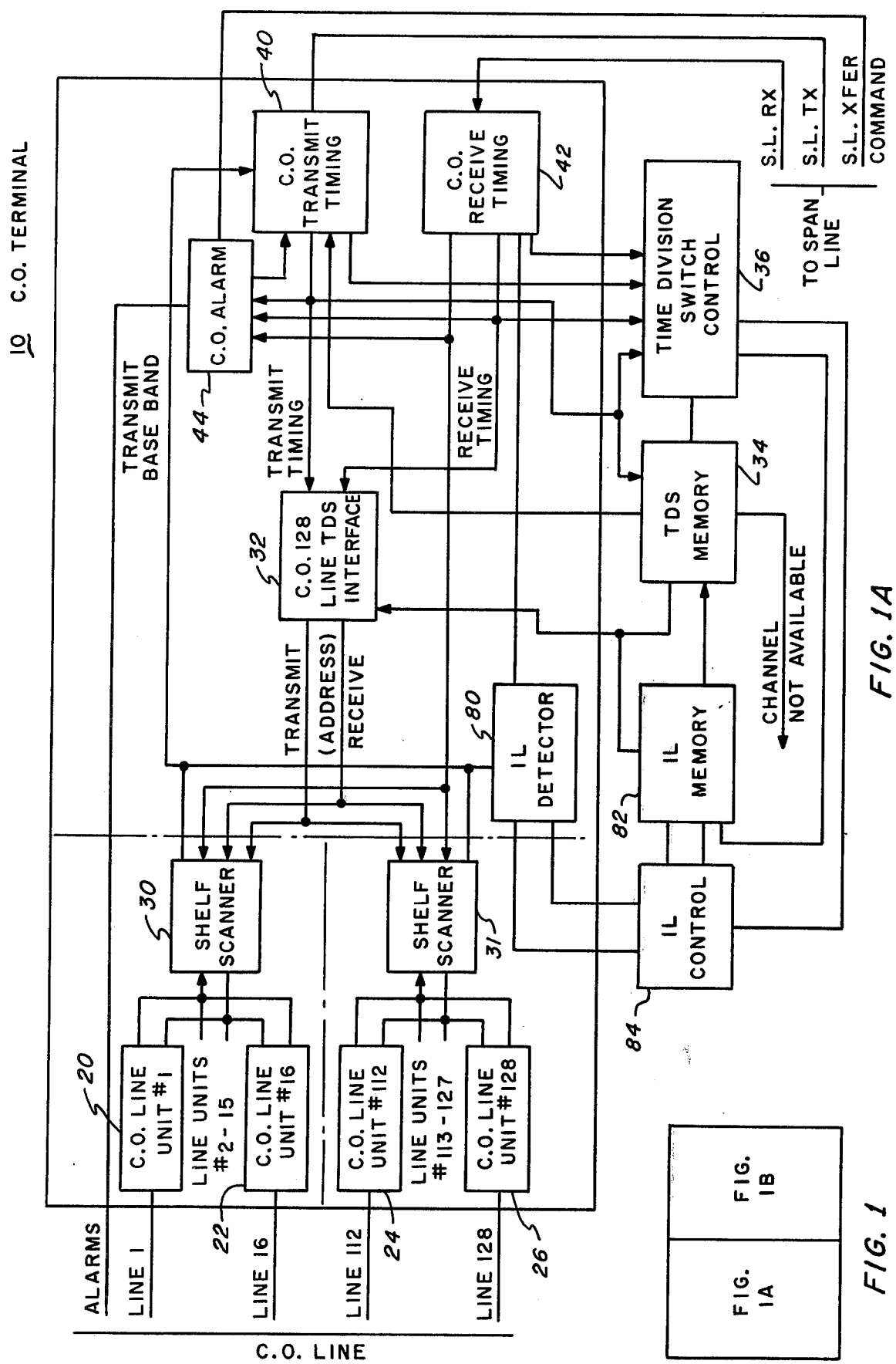

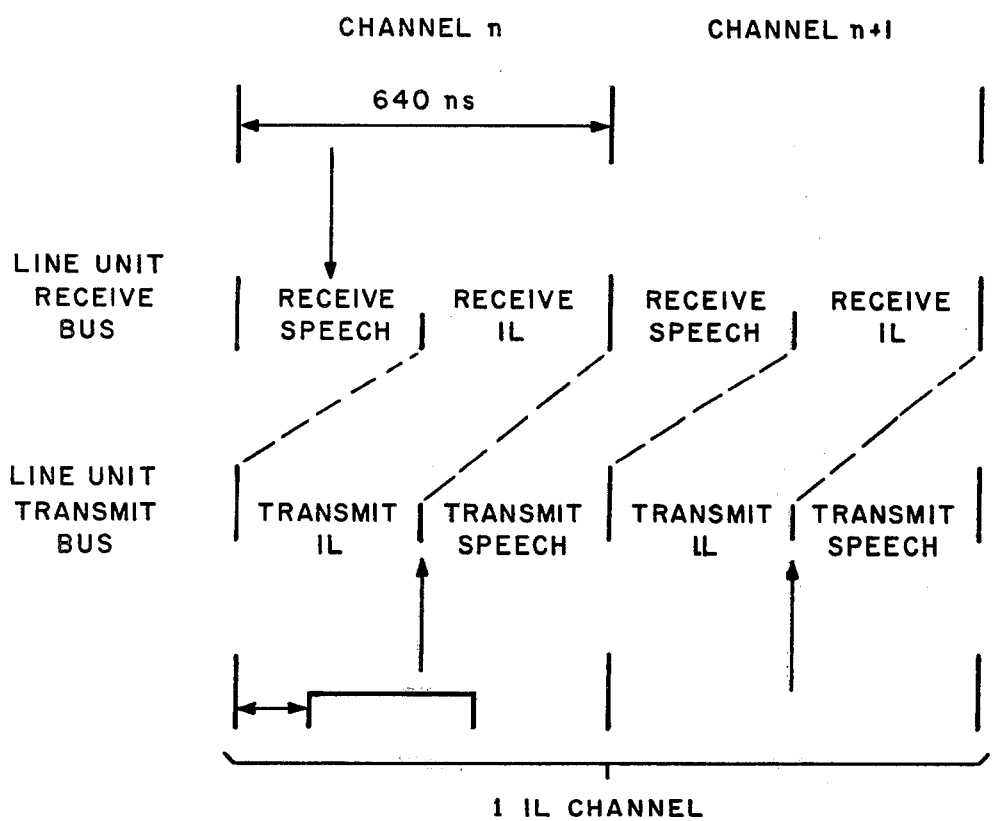
FIG. 9
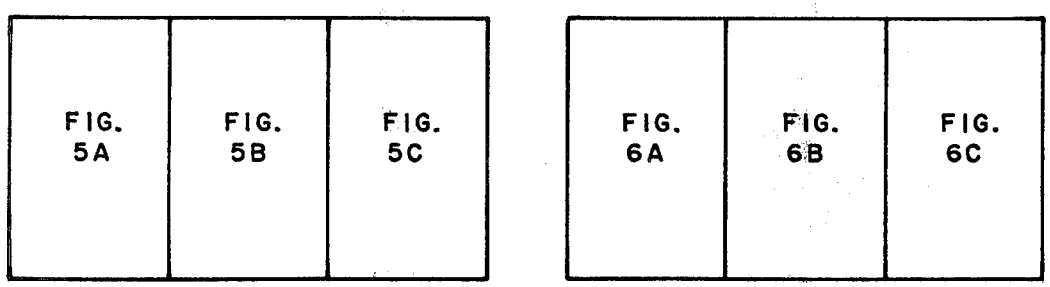
FIG. 5
FIG. 6

INTRA LINK CALLING WITHIN A SUBSCRIBER DIGITAL SYSTEM

RELATED APPLICATIONS

A companion application was filed previously by me on Dec. 9, 1974 under U.S. Ser. No. 530,954 entitled "Subscriber Digital Multiplexing System with Concentration", now U.S. Pat. No. 4,001,514, showing a basic system for providing a subscriber line multiplexing system. This present invention is a feature which may be inserted into that system. Reference may be had to that application for more detailed showing of various portions of the multiplexer system.

BACKGROUND OF THE INVENTION

The present invention provides an intra link or intra terminal call completion apparatus for a subscriber digital multiplexing system. Subscriber digital multiplexer systems are known generally. Such systems provide a carrier span line or the like to provide plural channels between a CO and one or more remote terminals, each remote terminal having a plurality of station lines connected to it. Intra link calling or local link calling is completed at a remote terminal for calls between stations connected to the same remote terminal. In this way, two span line channels are freed for further use by completion of the call locally. In such systems, the intra link capability is generally low, on the order of four links for 24 channels available. In such systems which generally employ space division switching, a latch may be set for an off-hook line and a tone is sent to that line. When the tone is detected, the latched line and a line detected as having the tone, are marked and the calling trunk is freed when a local link has been designated to handle the call.

SUMMARY OF THE INVENTION

Intra link processing comes into operation in the present digital multiplexer system when a call is completed through the central office switching apparatus and over the span line through the remote terminal to a line unit and after ringing has been started. A check is originated from the channel memory associated with the terminating line of the time division switch of the multiplexer to see if any calls are originating from the same remote group as the terminating line. All lines accessible from one shelf scanner will have their addresses identical as to the three most significant bits, and can be identified in this way. Means are provided to enable shelves to be assigned to a group in any sequence. If a line in the same group is in the call-originating condition, then a tone is generated at the CO multiplex terminal and sent out on the line from the terminating line through the central office switching apparatus toward the originating line. If a originating line in the associated group of shelves receives the tone during the proper channel period, then a call transfer is activated to emit a signal to the remote terminal unit of the originating and terminating parties, indicating an IL channel is available by the channel organizer.

Switching is effected within the remote terminal by transferring the call from the normal call processing portion of two channels to the intra link portion of two adjacent channels. The call is completed within the remote terminal or group during the intra link channel periods. A channel is divided into halves, one half being the normal call processing portion and the other the intra link portion. On the completion of the switching at the remote terminal, the channel memory unit for normal speech channel control drops the call from its memory, and the channel is available for other calls.

A separate memory stores the address of the originating and terminating line in its own memory for control of the call at the CO by the use of supervisory channels.

Control information concerning the call passes over the span line during the pendency of the intra link call but the call speech path is completed only through the remote terminal.

Supervison of the call is effected during one control channel which is employed for IL control. As noted in the companion case, the exemplary system employs 35 channels, 32 for speech or information transmission and reception and 3 for control functions. One of these three is allocated for intra link and time division switch supervisory control.

For the completion of a call between the different channel portions, a latch in the remote timing unit samples the condition of a channel in the middle of the pulse, and the latch holds for one full channel period. An output gate from the latch provides the one-half channel interval.

By the use of this approach of employing two local channels for an intra link call, the number of intra link calls which may be in process (16) total one-half the number of normal speech channels (32) in the system. Thus, by use of the intra link apparatus, a total of forty-eight calls may be in process in the system at one time.

It is therefore an object of the invention to provide an improved, high capacity intra link calling apparatus for use in a subscriber digital multiplexer system.

It is a further object of the invention to provide an intra link calling capability which allots one-half of each channel calling period for intra link calling and associates one calling line unit with one called line unit during half cycles representing adjacent channels.

It is a further object of the invention to provide an intra link calling aparatus for a digital multiplexing system in which the intra link channel capability is one-half of the number of normal speech channels for the system.

It is a further object of the invention to provide a time division multiplex communication system between a central office terminal and at least one remote terminal in which there is an intra link apparatus for effecting speech communication between two lines at the same remote terminal independently of the central office terminal.

Other objects, features and advantages of the invention will become apparent from the following detailed description viewed in conjunction with the drawings described briefly hereafter.

BRIEF DESCRIPTION OF THE DRAWINGS

FIG. 5 shows the proper arrangement of FIGS. 5A-5C;

FIG. 6 shows the proper arrangement of FIGS. 6A–6C;

FIG. 9 is a chart showing the relative positioning of channel sections used for intra link calling.

DETAILED DESCRIPTION OF THE DRAWINGS

Briefly stated, the call sequence for an intra link call or local call in the system follows the principle of allowing a call to progress normally as set out in my copending application, U.S. Ser. No. 530,954, filed Dec. 9, 1974, now U.S. Pat. No. 4,001,514, and by waiting until the called line answers at which time a memory location individual to the trunk channel used by the called line is marked. The location operates circuitry common to all trunk channels which, in turn, causes a digitally synthesized tone to be sent out to the called trunk channel. The calling trunk channel which receives the tone is connected to a tone detector circuit which, in turn, detects the tone received during the proper channel and as a result sends a signal back to the intra link memory.

As a further test, when the tone has been successfully received, the frequency of the tone is shifted and a check is made to see if a corresponding change occurs to the frequency of the incoming tone. When all conditions are satisfied, instructions are sent through the remote terminal to transfer the two parties to the local link called herein the intra link. A signal is sent to the control circuit at the CO terminal to release the two trunk channels which had originally completed the call. This last-mentioned signal cancels any information contained in the CO memory locations individual to the two lines being joined in the intra link call and frees the two channels for other calls.

The call transfer occurs by switching the call at the remote terminal of both calling and called station to two unused portions of adjacent channels, the channel periods having been subdivided into normal call portions and normally unused or intra link portions.

SYSTEM BLOCK DIAGRAM

Figure 1B:
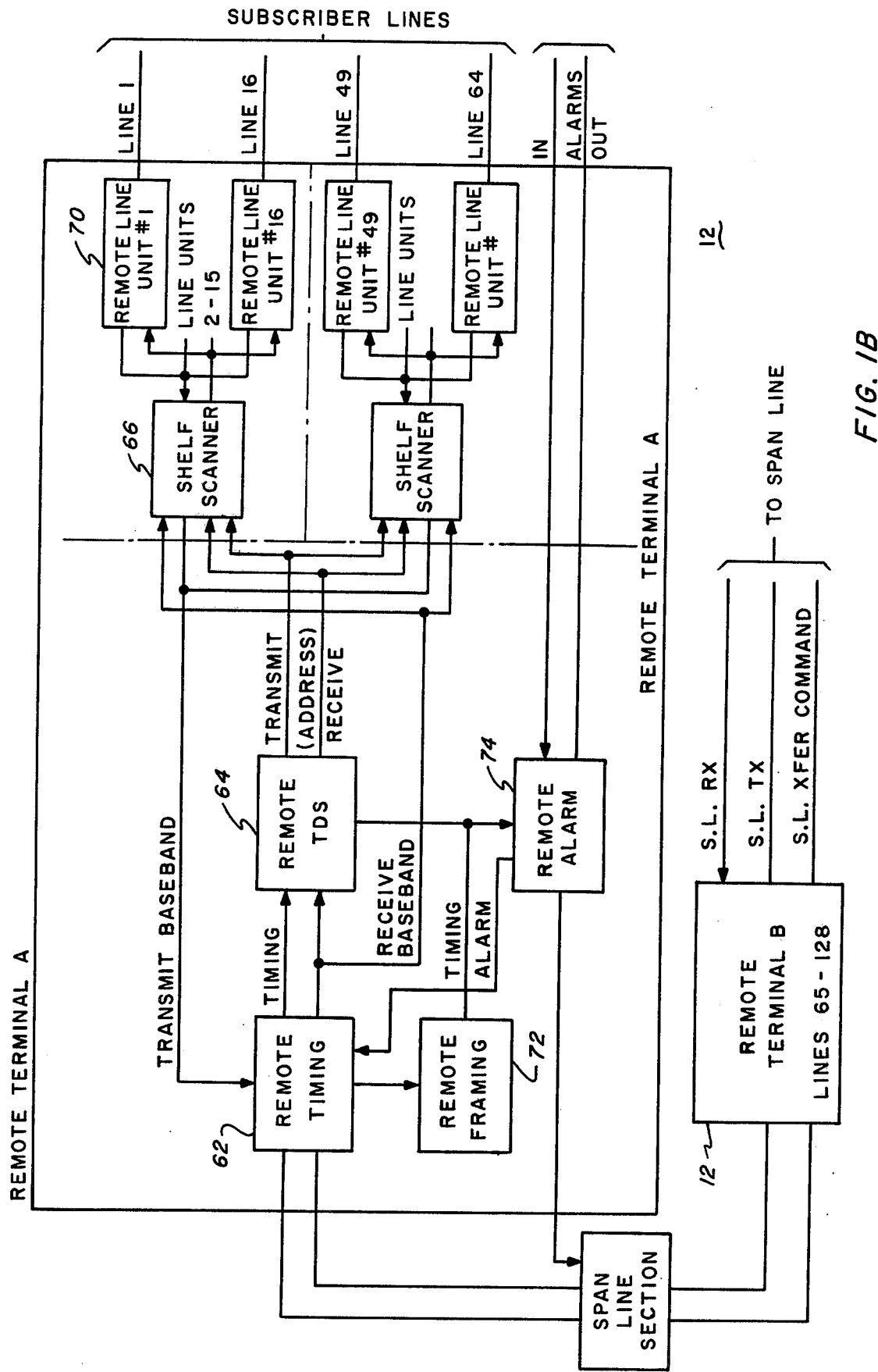
FIG. 1 is a chart showing how 1A and 1B are positioned to comprise a schematic block diagram of the system.

In FIGS. 1A and 1B, I show in block form a multiplexer to which my intra link calling function has been applied. The basic system shown is generally similar to that shown in my copending application noted previously. The system shown has the capability of serving 128 lines over 32 duplex channels in which two unidirectional leads are directed to each line unit. Since there are more lines than channels, a concentrator or switching stage is employed. In the system shown, this stage employs time division switching in which memory position is maintained permanently for each channel. In each memory position, the address of a line using that channel is stored.

The system disclosed in the drawings includes a central office (CO) terminal 10 (FIG. 1A) and a plurality of remote terminals, two such terminals — 12A and 12B — (FIG. 1B) shown. As many as eight remote terminals may be coupled to the CO by a suitable digital repeatered line such as the type known as the T1 carrier system. The number of line units per terminal is limited by the maximum capacity of 128 lines. With two remote terminals, as shown herein, each may have up to 64 lines in multiples of 16 lines, 16 lines constituting a line group. Connection of the individual station lines to the remote terminal is usually by way of solid conductors.

Within the CO terminal 10, the inputs to the CO line units shown, such as 20, 22, 24 and 26 shown are connected to the final switching stage of the CO network on a line-to-line basis in the conventional manner. The line unit outputs are commoned to respective shelf scanners 30 and 31, each having access to a plurality of line units to provide partial address decoding between the respective line units and the time division stage (TDS). The TDS within the CO includes a time division interface circuit 32, a time division memory 34, and a time division control 36.

The interface unit 32 provides one stage of address decoding in directing line unit selection data to the proper shelf scanner unit for one direction of information travel and from the scanner unit for the reverse direction of information travel.

The control unit 36 provides the time division decision-making or switching control for recording the line status and channel assignment and status in the TDS (time division system) memory 34 for call completion and supervision. The control also acts to distribute the assignment of channels evenly to the 32 channels of the system by rotation. Within the TDS memory unit 34, each channel is accorded a permanent position to record line addresses to provide coordination between the channel and the lines which may be assigned to that channel. Information on the assignments is forwarded from the memory to the memory in the remote terminal for coordination at the remote terminal involved.

In addition, the CO terminal provides timing control for both the transmit and receive directions through its transmit timing control 40 which is the master timer of the system. Timing signals are initiated in the transmit timing circuit 40, sent to the remote timing circuit 62 and returned to the receive timing circuit 42 for comparison and for alarm control through alarm circuitry 44.

Control and digital data are sent from the transmit timing control 40 through a conventional span line switch (not shown) and over the span, which as mentioned, may be a T1 line or the like, to a span line switch at a remote terminal. Within the remote terminal of FIG. 1B, received information is channeled through the remote terminal timing circuit 62. The remote terminal timing circuit 62 (a slave of the CO transmit timing) forwards received data to the remote TDS circuit 64 for directing shelf unit selection to the shelf scanners 66 which perform a further decoding of information to select a desired line unit 70. The timing circuit sends control information to framing circuit 72 to provide a pattern match of timing and synchronization control signals to actuate alarm circuit 74 when indicated. In a remote terminal, the only additional circuits over and above those used for the multiplexer with concentration are the originating and terminating memories within the remote TDS. The function of the memories within the intra link (IL) call processing will be explained later herein.

The system as shown herein uses 35 channels per frame in a full duplex system, the first three channels A, B and C being used for control and synchronization purposes. The final thirty-two channels are used to carry message information and messages between a CO line unit at a central office and a remote line unit separated from the CO by a distance with a span line between the CO and each remote unit. The span line as is known, is comprised of two unidirectional lines. Within this framework, the system provides facilities for time division multiplexing the 32 channels and time sharing of those 32 channels by up to 128 lines. The system is compatible with T1-type span lines and may use T1-type repeaters, as are well-known in the art. The system as described to this point is shown in detail in the cited copending application.

The intra link feature provides a method of by-passing the span line for speech transmission so that calls from a remote terminal line unit destined for a line unit at the same terminal may continue without use of the span line speech channels. All calls are first completed using the spanline. A check is made to determine whether the call is a local one eligible for use of an intra link channel. A call found to be originated locally and terminated locally may be transferred to intra link control if an intra link channel is available.

The intra link (IL) feature uses, in addition to certain circuits of the CO and remote terminal, the services of an intra link (IL) detector 80, an IL memory 82 and an IL logic circuit control 84, all located in the CO. The detector 84 is apprised of the need for generating the transmission of a tone signal over the completed call path, generates that tone and detects the return of that tone to signify that intra link transfer should be effected and signals the IL control accordingly. The IL control then signals the IL memory to transfer the call to the IL mode to switch line addresses into the IL memory and to cause removal of these addresses from the normal call channel memory.

In the remote terminal of FIG. 1B, memories within the remote TDS 64 also act to provide intra link call control in agreement with information stored at the CO terminal.

An intra link call is a subscriber originated call at a remote terminal intended for another subscriber at the same remote terminal. The intra link feature permits a total of 64 lines to be in use at a given time — up to 32 in normal calls and up to 32 in intra link calls. Any eight lines at each of four terminals can use the intra link facilities while an additional 32 lines at that or the other remote terminal are engaged in trunk calls.

The intra link facility permits the IL calls to be made without tying up any of the normal speech channels except during the signalling period and beginning portion of a completed call. Local calls within the system can only be made if two or more normal speech channels are idle when the call is initiated since a call between the two stations of the system are initially processed through the two normal speech channels, and since each connection of a station to the CO requires the use of a speech channel.

The intra link control 84 determines the status of all 32 channels and determines when the correct conditions for intra link calling occurs. On the occurrence of these conditions, the control signals the detector to generate a called party identifier tone and initiates time out circuitry to make a call ineligible if it is not transferred to intra link within one minute. The intra link detector 80 initiates the identification of the location of the originating subscriber while checking for intra link eligibility and acts to generate an identifier tone signal. The intra link memory 82 stores the address of both the calling and called parties, transfers this information to the TDS memory at the CO channel for transmission to the remote terminal, causes the release of both normal channels when the intra link call is established and determines eligibility for intra link calling. If both parties are not from the same remote terminal, they are considered ineligible and the call is maintained in the normal manner using two channels.

The system of FIGS. 1A and 1B operates generally as follows: When a remote subscriber initiates a call, it is processed in the normal manner. Even if the call is to another subscriber on the same remote terminal or line group system, the CO equipment seizes the appropriate line unit and proceeds normally. The incoming call from the CO and the call from the remote terminal are both identified in the intra link memory unit 82. If the two parties are from separate remotes, the call proceeds normally; if, however, the two parties are drops from the same remote, the intra link memory unit 82 passes both their addresses to the TDS memory unit 34, which in turn, passes them via the CO timing unit 40 and span line to the remote terminal.

At the remote terminal, the addresses of both parties are passed into the remote TDS 64 which then sets up the intra link circuitry through the originating and terminating call memory.

The decision as to whether the intra link function is to be used is made at the central office and is transmitted to the remote terminal in the third or fourth bit of channel B, the second of the three control signal channels. The third bit is for intra link and the fourth for normal calls. Normal and IL channel assignments are transmitted in other positions of channel B. A total of 64 line addresses are transmitted to the remote terminal in one channel B cycle.

Within the remote TDS interface 64, the addresses of the lines in an intra link path are written into the intra link memory, thereby causing the line unit addresses of the calling and called stations to be selected during the chanel scanning period. Control information is received from the CO which causes the normal channel memory positions assigned to the two lines during call initiation to stop selecting the lines during the channel scanning period. This operation frees the channels for use by other lines.

After the call is finished, the on-hook status is sent to the CO in the normal manner and the intra link connection path is released. The two line units may then be scanned in normal sequence.

INTRA LINK CONTROL 84

Figure 2:
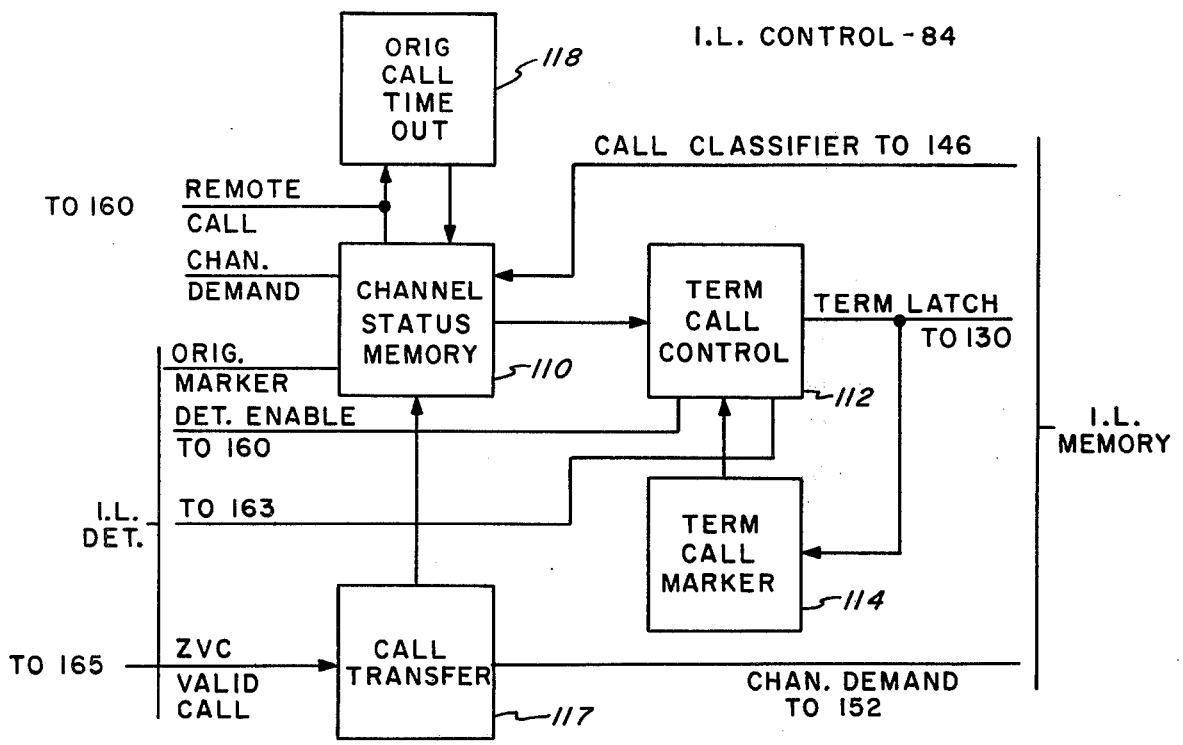
FIG. 2 is a schematic block diagram of an intra link control circuit of FIG. 1.

The intra link control circuit shown in block form in FIG. 2 receives signals from the CO TDS control 36 to originate an intra link eligibility check and for this purpose, it holds the status of all 32 system channels in the IL control channel status memory 110. This status memory of 32 positions (one per speech channel) has four bits per position and is used to examine the intra link status to determine when correct conditions for intra link calling occur. Of the four bits per channel, bit No. 1 is marked if a ring signal from the CO is received for this channel. The next bit is marked when a station goes off-hook. The condition of bit No. 1 is held when bit No. 2 is marked to maintain the direction of the call using that channel until the channel is released. Bit No. 3 is marked when a condition is reached that intra link calling is not now possible but may be possible subsequently. Bit No. 4 is marked when the call is found to be ineligible for intra link calling, i.e., both lines not from the same remote terminal.

This status memory 110 provides an indication whether a call in a channel is an originating or terminating call at a remote terminal and whether a channel is in use or not.

When an originating call at the CO is indicated, the channel demand lead from the status memory 110 is activated. The memory first is checked to determine whether any lines are off-hook and have not been rung indicating a call originating at a remote terminal in the system. If the answer is yes, operation of the originating call time-out unit 118 is started to time out calls not transferred to intra link during the timing period. The memory is then continuously checked to determine when a terminating call occurs. When a line has been rung and gone off-hook and time-out unit 118 has not completed its time out period, an intra link check is instituted through the terminating call marker 114 which stores the address of the assigned channel until intra link tests for that line are completed. The terminating call control 112 directs the operation of the marker 114 and enables the detector unit 80 at the appropriate time over the detector enable lead ZDE. The terminating call control also limits the time duration of identifier tone to minimize effect to subscriber of the tone.

If all tests prove that an intra link transfer should be instituted and that intra link channels are available, call transfer unit 120 provides a demand for an idle intra link channel to handle a call at the remote terminal of the originating and terminating line.

INTRA LINK MEMORY 82

Figure 3:
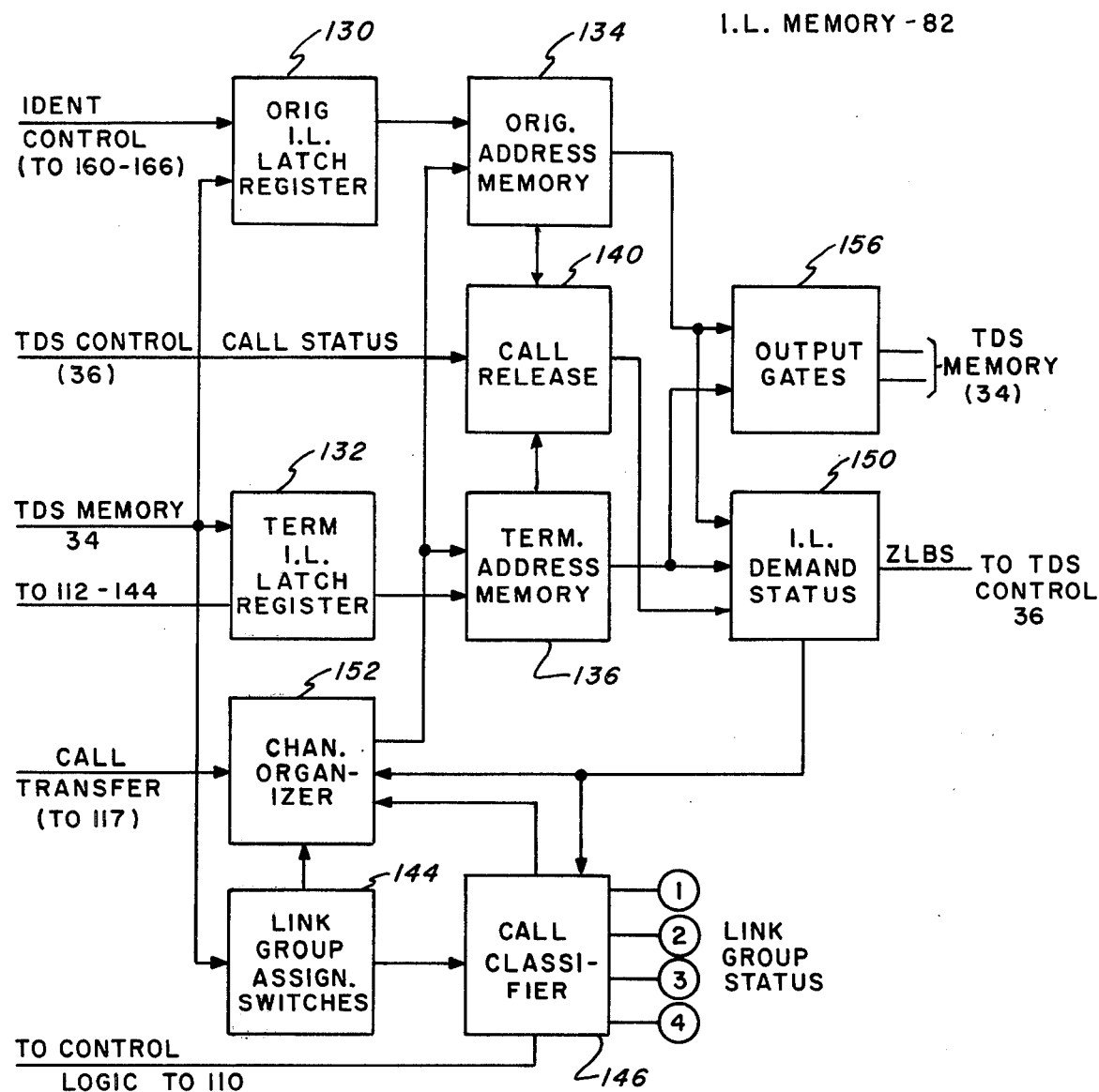
FIG. 3 is a schematic block diagram of an intra link memory circuit of FIG. 1.

The intra link memory shown in block form in FIG. 3 provides temporary memory in respective latch registers 130 and 132 for holding the addresses of the originating and terminating lines involved in a possible intra link call while eligibility for IL transfer takes place. These addresses are then fed to the more permanent originate and terminate 8×16 memories 134 and 136 when an intra link transfer is called for. Output gates 156 are used to provide information to the TDS memory of the line status from the IL memories, and sends data to the TDS memory of the line status from the IL memories, and sends data to the TDS memory for transmission to the remote terminals. The IL memory causes the release of normal channels by way of call release 140, and IL demand status 150. Transfer to an IL channel is demanded by demand unit 150 and transferred by channel organizer 152 once an intra link connection is established, and cause the release of the intra link section when the call is completed. The IL memory stores originating station and terminating station addresses in latch registers 130 and 132 while eligibility is determined and is operative to determine intra link eligibility through link assignment switches 144 and call classifier 146.

INTRA LINK DETECTOR 80

Figure 4:
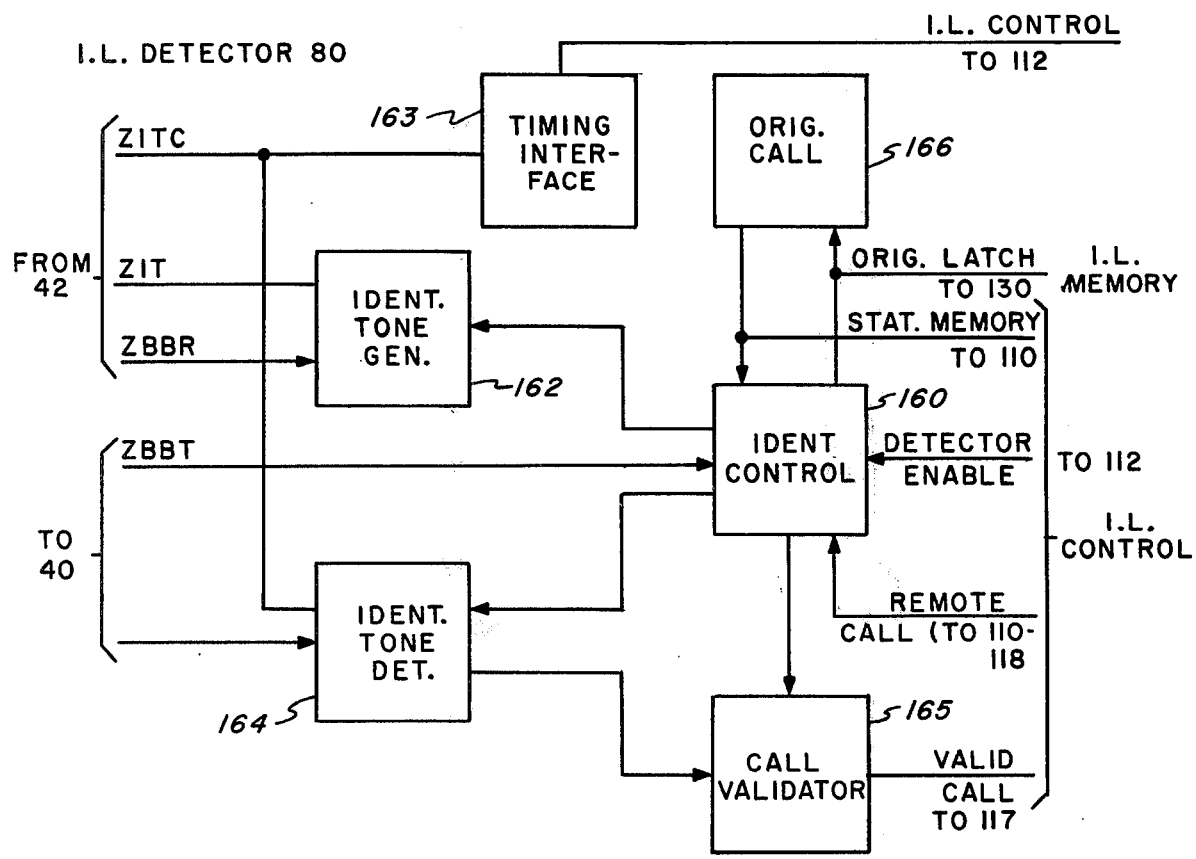
FIG. 4 is a schematic block diagram of an intra link detector circuit of FIG. 1.

The intra link detector shown in block form in FIG. 4 identifies the location of originating channels through identifier control 160 while eligibility for intra link calling is being established. This detector originates and transfers an identifier tone from the transmit timing phasing to receive timing phasing and detects the receipt of the tone for validation of the call as eligible for intra link processing.

The detector enable input lead ZDE which may be followed to identifier control circuit 160 is activated from the IL control and memory when a tone is to be sent out on the line. The originating call marker 166 stores the address of the assigned channel until intra link tests for that line are completed.

The identifier control circuit 160 activates the tone generator 162 to send the tone from the CO over the receive timing circuit. When tones are returned from the CO timing, they are detected in detector 164 and validated through validator 168.

The timing interface 163 provides gating for channel control timing between the transmit timing and receive timing.

Thus, stated in another way, the IL detector generates identifier tones which are used to identify the location of the originating and terminating channels during call set-up. On receipt of an enabling signal from the channel status memory and/or the terminator call control circuits in the IL control, the identifier control circuit activates the identifer tone generator which sends the tones to the CO receive timing unit. Similarly, the identifier tone detector circuit receives tones from the CO transmit timing unit and, after identification, passes the tones to the call validator circuit which then informs a call transfer circuit in the IL control unit whether the call is valid.

Figure 5A:
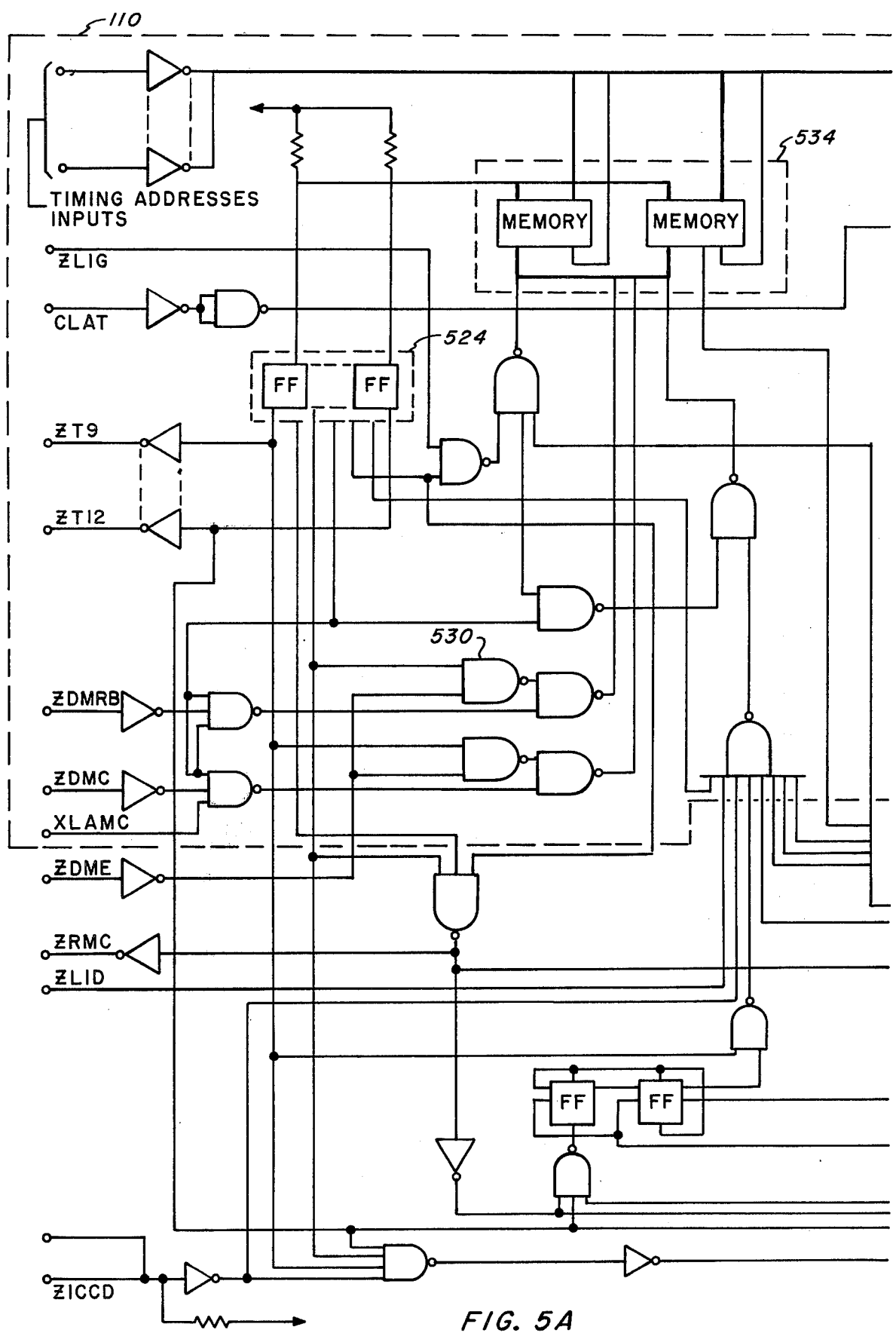
FIG. 5A–5C together constitute a circuit diagram in greater detail of the control unit of FIG. 2.
Figure 5B:
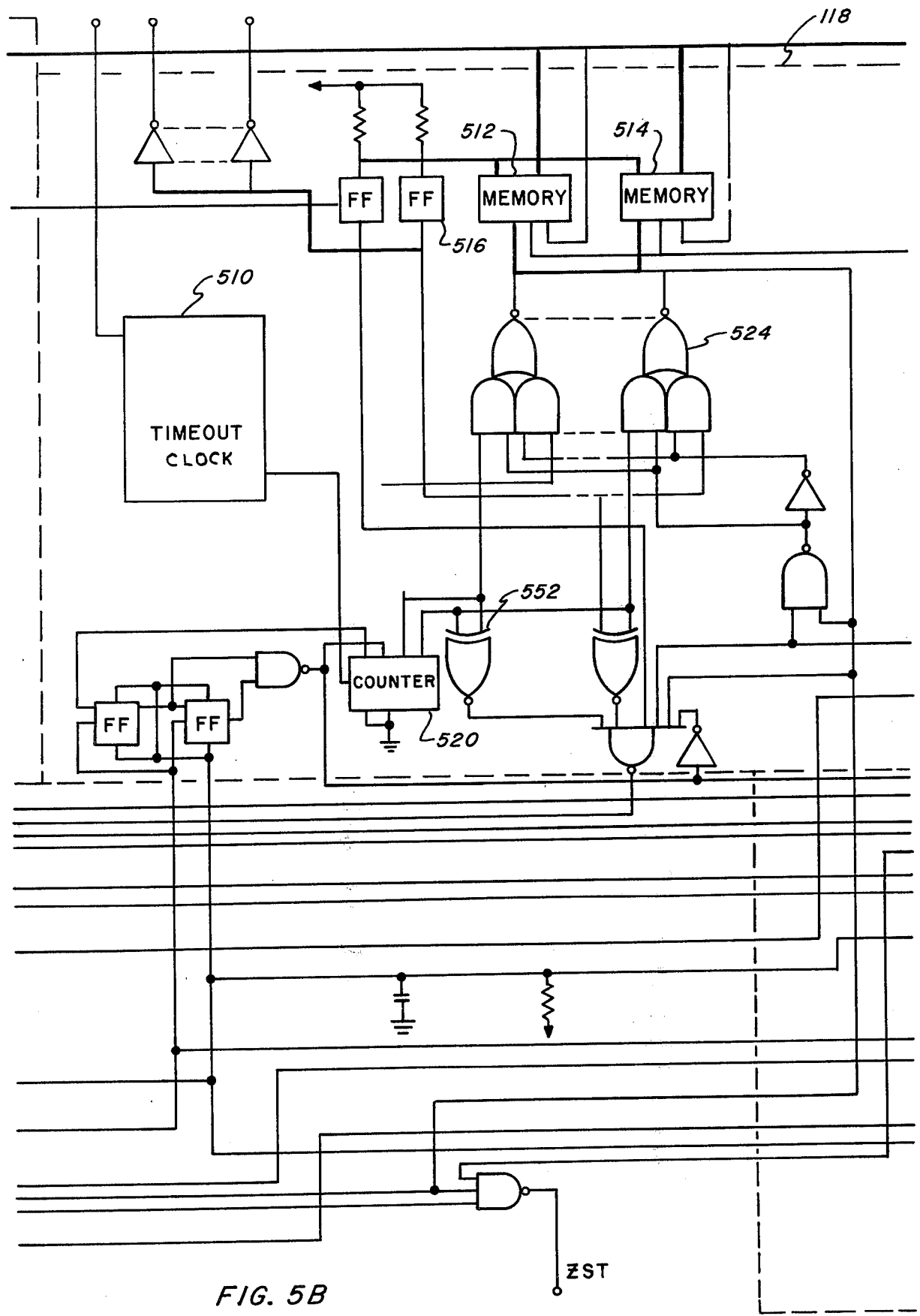
Figure 5C:
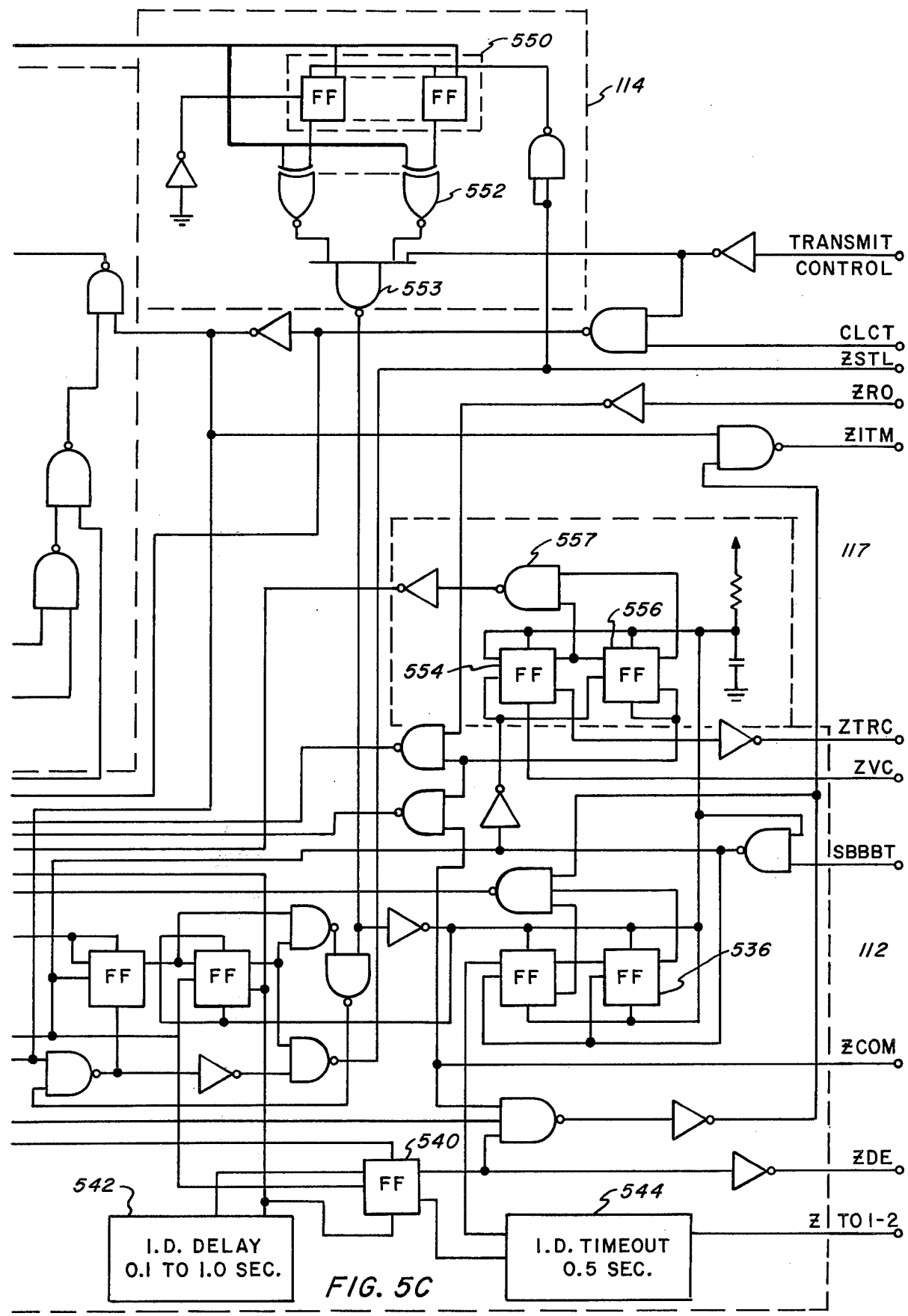

In FIG. 5, we show in greater detail the IL control circuit 84 of FIG. 2. In FIG. 5, the originate time out circuit 118 is a settable maximum two-minute timing circuit whose cycle is initiated on the start of an IL eligibility check. The circuit is capable of timing out 32 channels simultaneously under conditions where the time out for each channel does not begin at the same time. This is achieved by breaking down the time out period into eight intervals and storing the intermediate counts in memories 512 and 514. The time out clock 510 increments counter 520 eight times to advance one time out cycle. When a time-out commences for any channel, the condition of the counter 520 is stored in a memory position in 512 or 514, unique to that channel. When the counter advances eight counts, gating circuit 522 determines that the time out is complete. Gating circuit 524 and latching circuit 516 control the routing of signals to and from memories 512 and 514. If no identification of a call as an IL call and no IL transfer occurs within the set period, the IL check is terminated and the call continues as a normal call.

The channel status memory 110 as shown in FIG. 5 comprises a plurality of gates 530 fed from a four-bit latch register 524 to input the 4×32 memory 534.

The terminating call control 112 comprises a gating and flip flop network 536 for receiving input from the IL detector and includes an enabling flip flop 540 to enable the tone detection on lead ZDE. This section also includes two time delays, timer 542 delaying the start of tone transmission allowing the call to enter a stable pattern before the tone signal is initiated, and the other, timer 544 for timing out the identifier. This unit responds to the terminating call marker 114 which comprises a five flip flop latch register 550 and timing gates comprised of exclusive OR gates 552 feeding a six input NAND gate 553 to mark the terminating call channel.

The call transfer unit 117 acts as a pulse aligner and is comprised of two flip flops 554 and 556 and a NAND gate 557 responding to input from the IL detector.

Figure 6A:
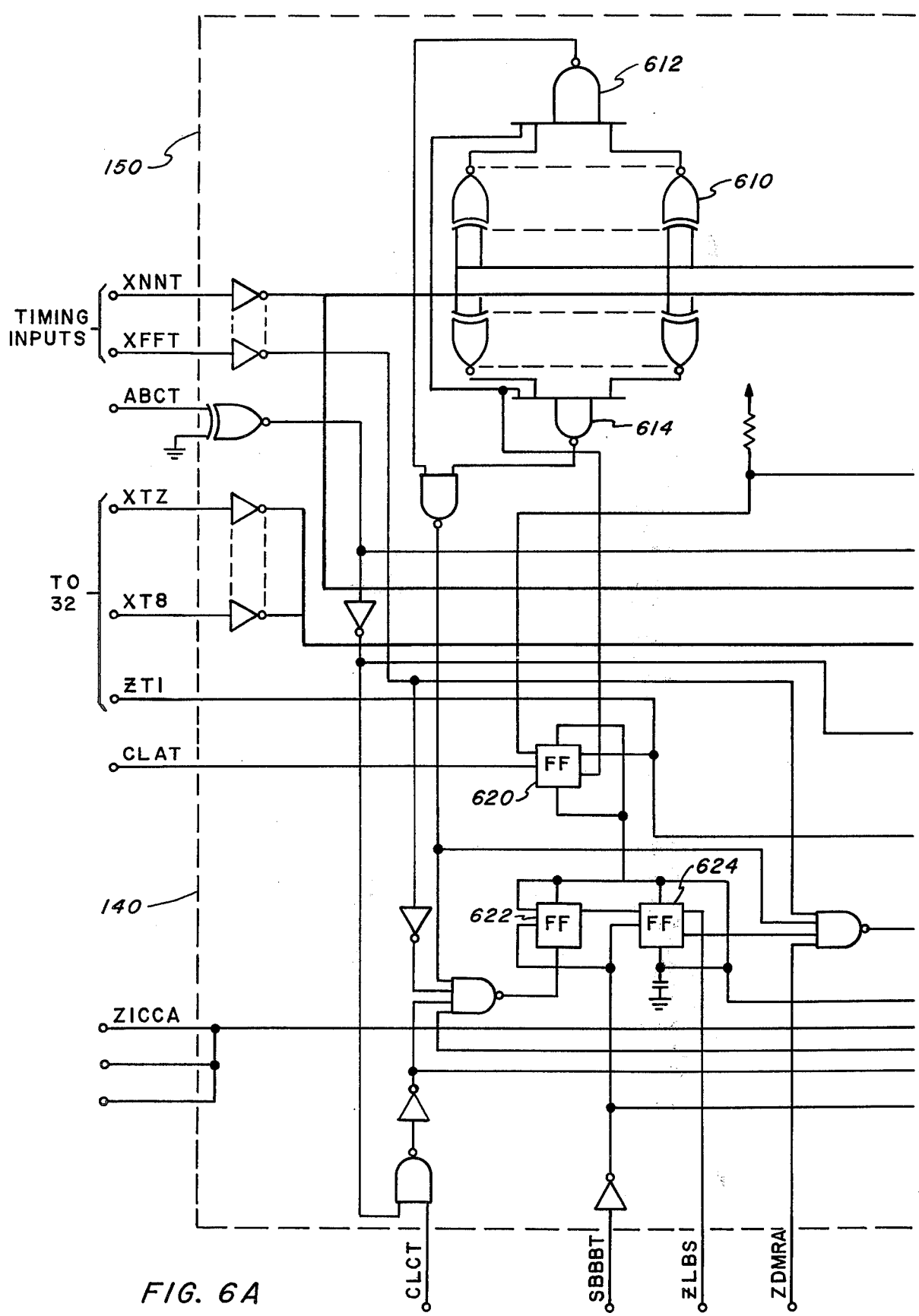
FIG. 6A–6C together constitute a circuit diagram in greater detail of the memory circuit of FIG. 3.
Figure 6B:
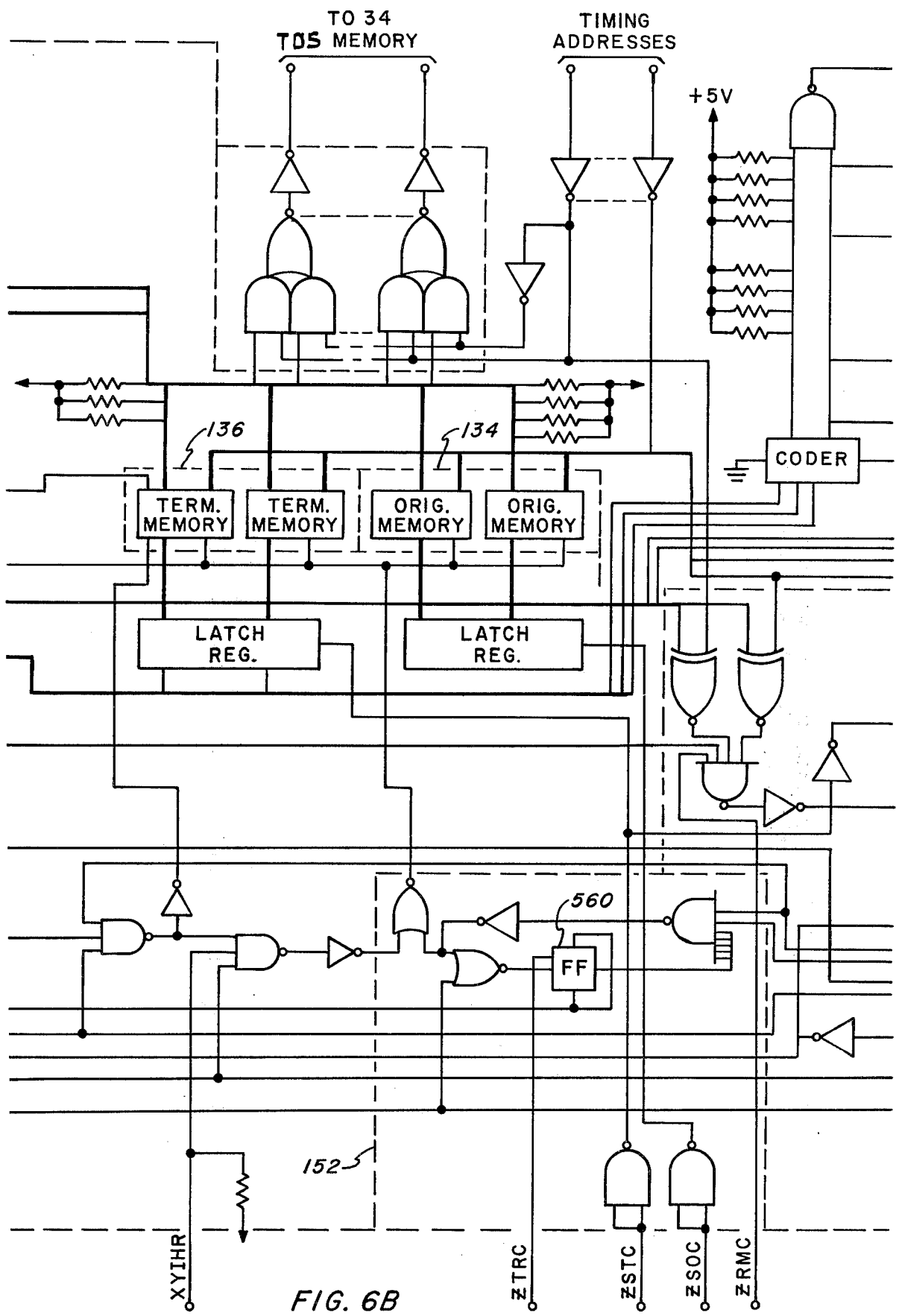
Figure 6C:
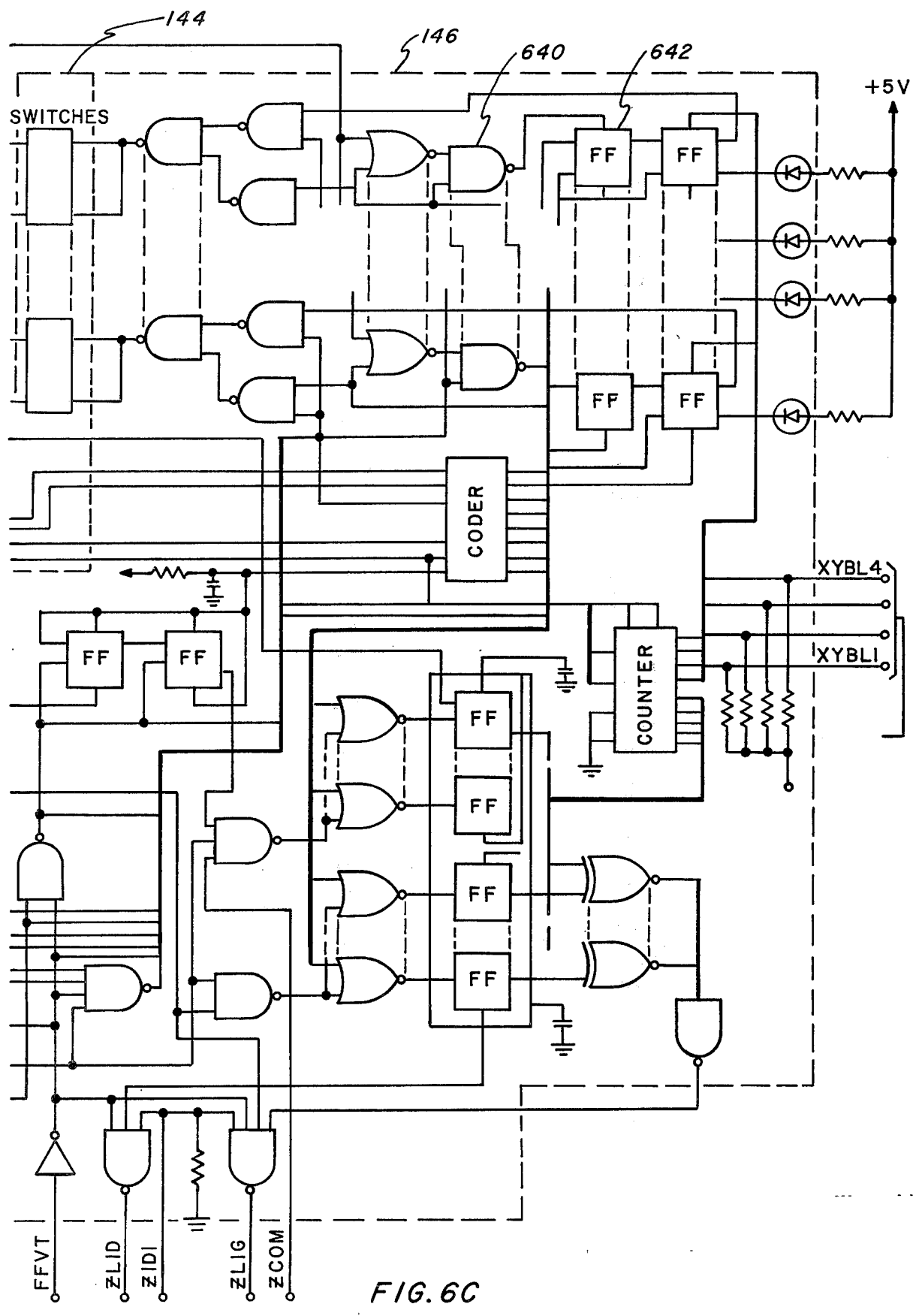

The IL memory 82 is shown in detail in FIG. 6 and includes as its basic elements the two 8×16 memories, memory 134 for the address of a line associated with an originating channel and a second memory 136 of like size for terminating lines. Associated with each of these memories and providing temporary memory for input to the memories are respective latch registers 130 and 132.

The output from memories 134 and 136 to the TDS memory is over the respective multiple NAND gates identified in FIG. 3 as output gates 156. The call release circuit 140 and the IL demand status are shown in FIG. 3 as separate boxes and are, in fact, part of the same gating and flip flop chain. The demand status section 150 is comprised of exclusive OR gates 610 receptive of signals from the memories 134 and 136 to feed through multiple NAND gates 612 and 614 to output to the demand status flip flops 620, 622 and 624 for the purpose of signalling the release of an IL channel and to block the demand for a normal channel when an output pulse from the flip flops appears on lead ZLBS as a cancellation of channel demand signal for the TDS control unit.

The channel organizer 152 is comprised of gates and a flip flop 560 which receives as its input a signal on lead ZTRC to provide a proceed signal for writing in the memories 134 and 136.

The link group assignment switches 144 comprise switches for assigning shelves to link groups. In the apparatus shown, a link group is a group of four intra link channels. Each link group is capable of handling calls between eight subscribers at the remote terminal to which it has been assigned. A link group cannot be split between two terminals. A total of four link groups are available for assignment to up to four remote terminals of a full multiplex system.

When establishing link groups, each CO line unit shelf is dedicated to provide intra link services for remote line units in the corresponding line unit shelf at a remote terminal. If the services of a particular CO line unit shelf are split between two remote terminals, the line units in the line unit shelves at the remote terminals cannot use the intra link facility. Multiple line unit shelves located at a remote terminal may be assigned link groups in such a manner that intra link calls may be set up within or between shelves at the remote terminal, independent of shelves assigned to other remote terminals.

This arrangement permits intra link calls between subscribers at a given terminal to all other subscribers at the same remote terminal.

Switches 144 in the intra link memory unit provide the means of selecting intra link facilities to be assigned to systems with random growth patterns. The switch positions provide link groups for any present desired pattern.

The call classifier 146 is associated with the switches to code and decode information to and from the switches and their output gating 640 and latches 642.

Figure 7A:
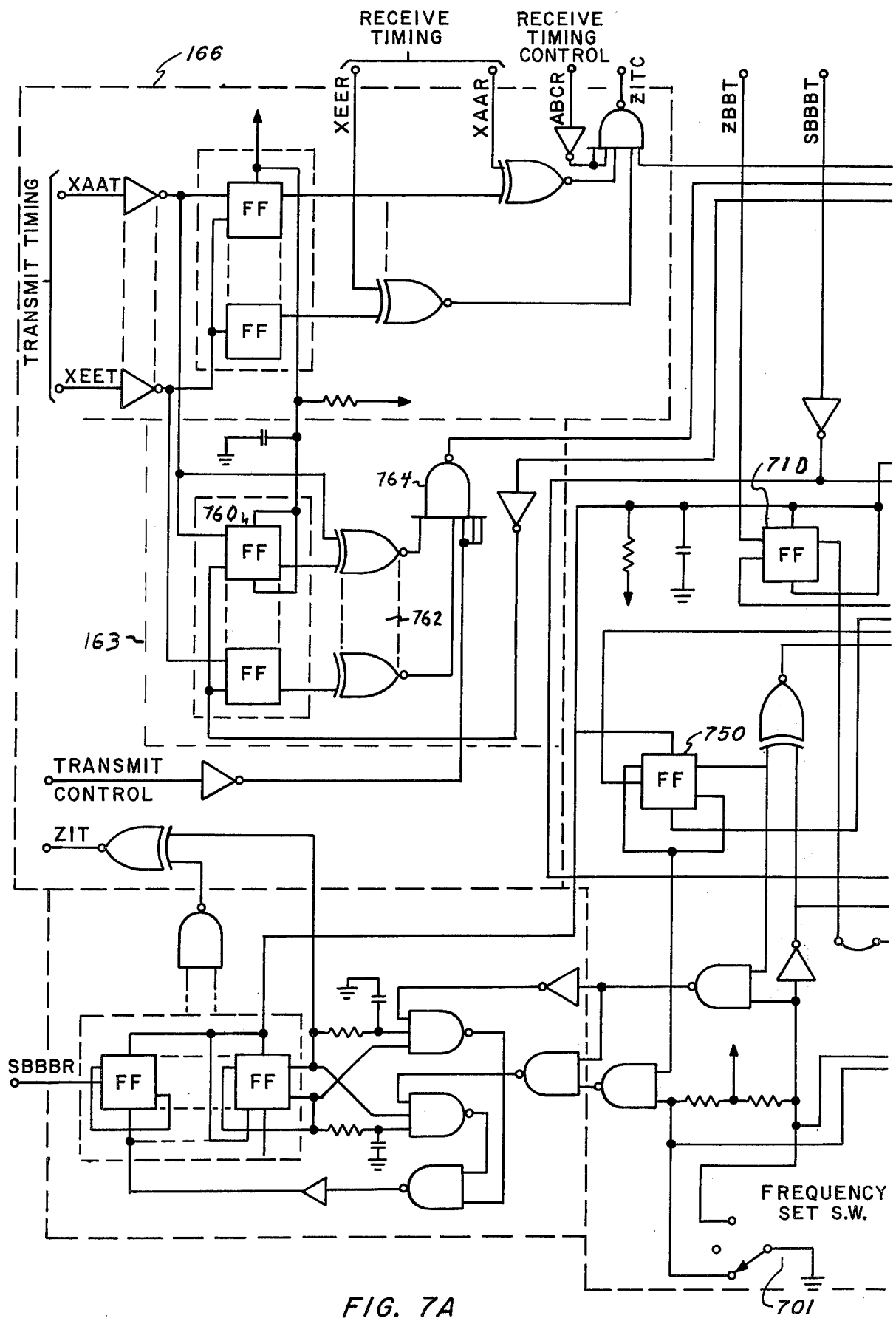
FIG. 7A–7C together constitute a circuit diagram in greater detail of the detector circuit of FIG. 4.
Figure 7B:
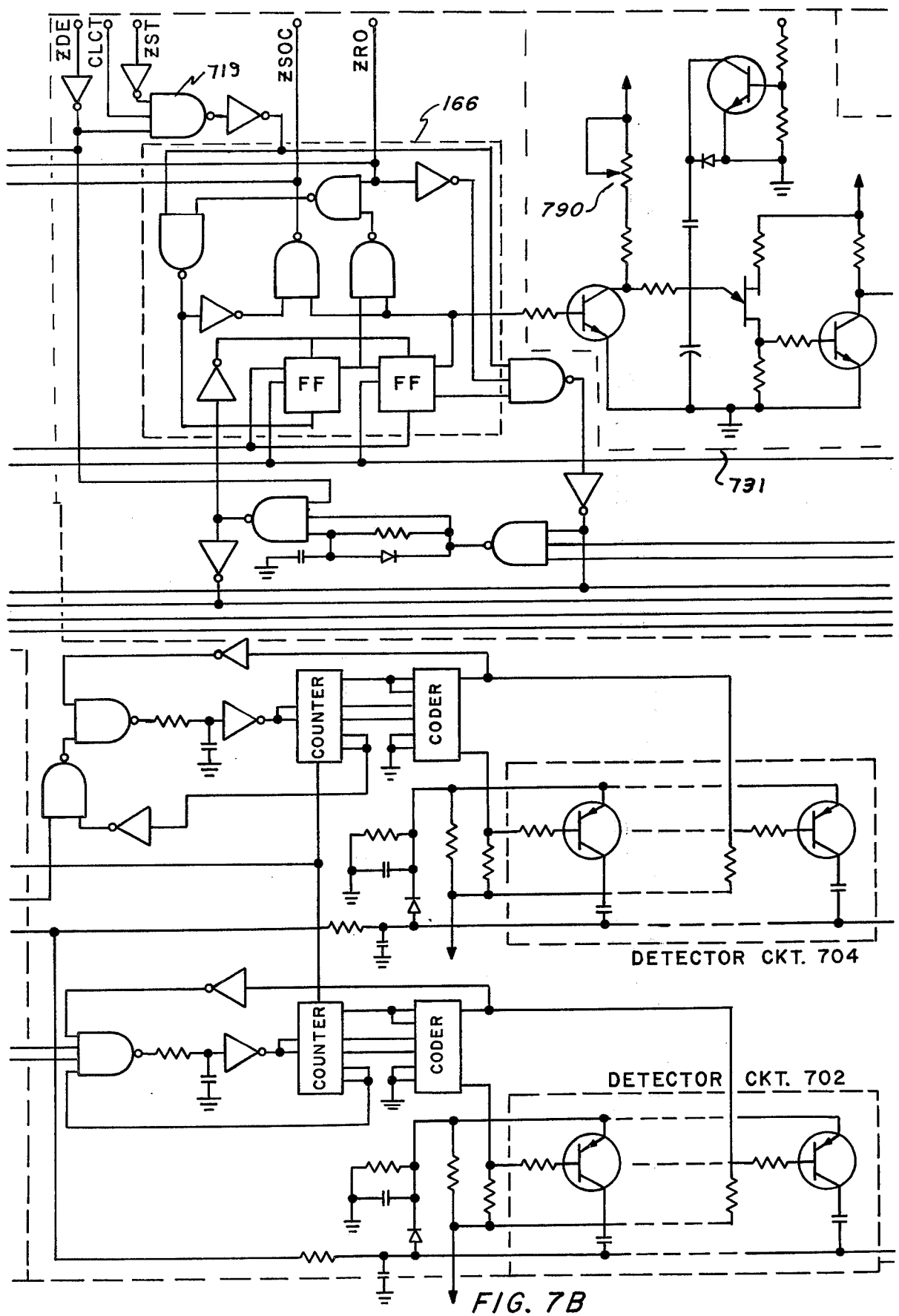
Figure 7C:
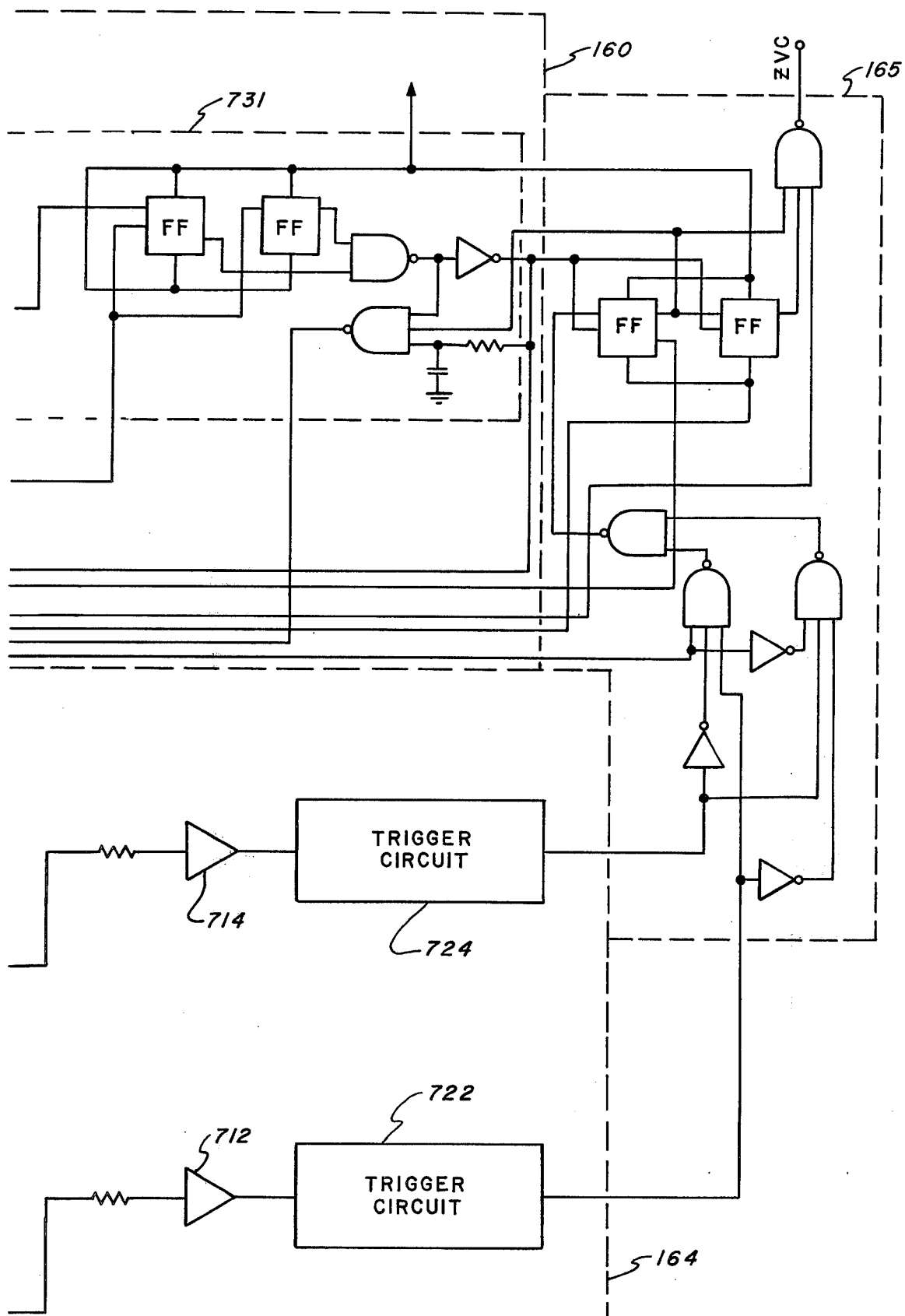

The IL detector 80 of FIG. 7 is essentially comprised of the tone generators and detectors and control gating for the tones. A flip flop 710 is clocked over the ZBBT to feed incoming code and start the detection process. The tone generator 162 is a two-tone synthesizer whose frequency is settable by the setting of the manual switch 701. This switch also controls the setting of the two-band pass filter detector circuits 702 and 704 and their respective amplifiers 712 and 714 and output detectors 722 and 724.

The detector enable input lead ZDE feeds the originating call marker 163 and ID control 160 by activating gate 719. This circuit also includes a frequency shift network 731.

The call validator 165 of the detector provides output on its lead ZVC as an output of its flip flops and gates when tones of both proper frequencies have been received. On the first tone, the frequency shift flip flop 750 is operated to shift the test frequency from the first to the second test frequency. The second correct frequency is signalled by the validator to produce an output indicating on lead ZVC that an intra link channel be allotted to the call indicated. This signal on lead ZVC passes to the IL control (FIGS. 2 and 5) and its pulse aligner flip flop 554 to produce an output on lead ZTRC to the memories to execute the IL transfer.

Figure 8:
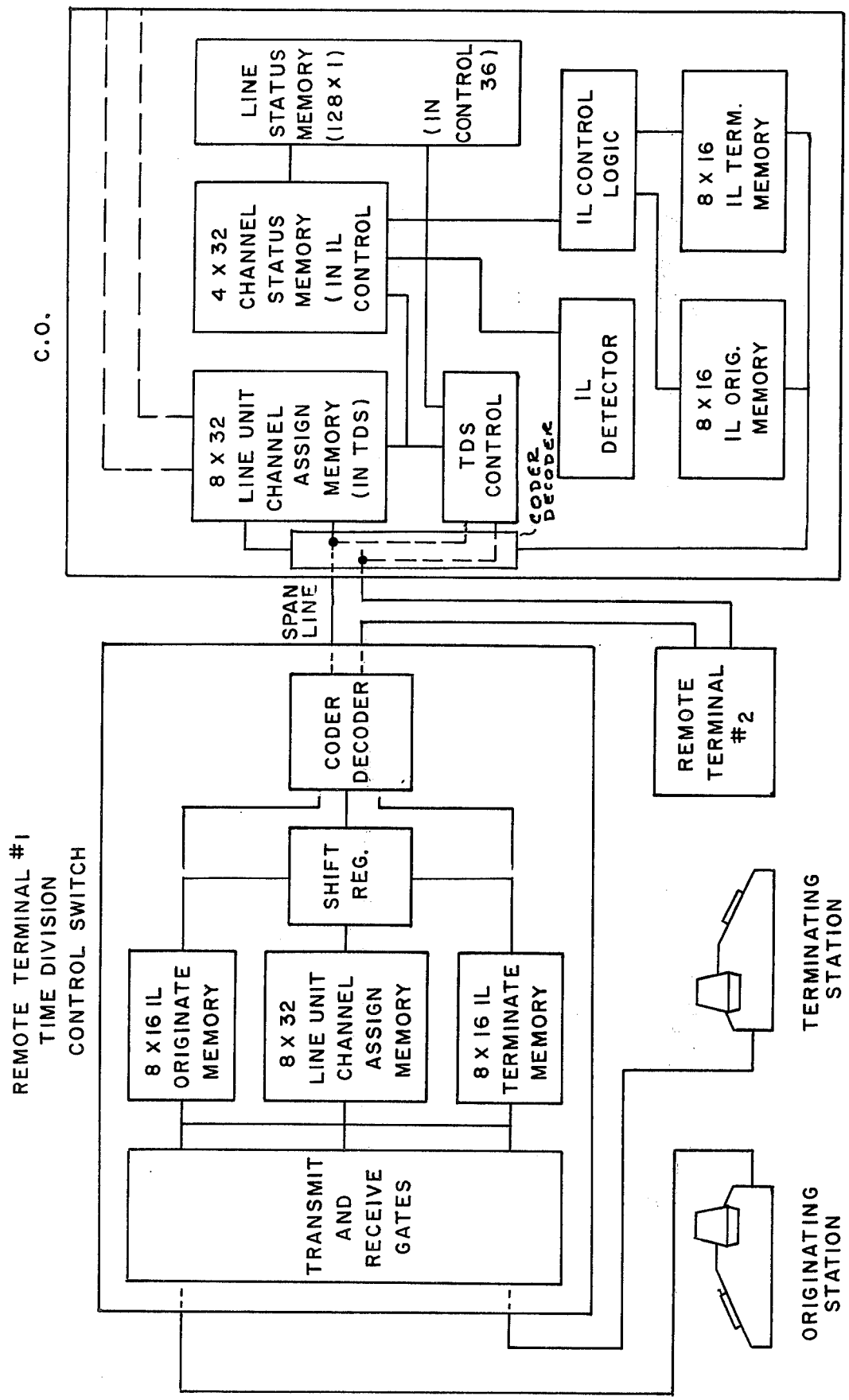
FIG. 8 is a schematic block diagram of the system showing the memories used in the intra link calling feature.

In FIG. 8, we show the memories used to process a call, check for intra link functioning and for transferring and controlling a call in the intra link mode. I show in the CO a TDS memory for storing eight-bit addresses of lines using the thirty-two channels. In the CO also are the channel status memory with a four-bit storage for each channel, the bits signifying (1) the channel line having been rung or not to signify as a terminating line or non-terminating (originating line); (2) off-hook or on-hook; (3) marked as temporarily ineligible for IL transfer, and (4) marked as ineligible for IL transfer.

When a call is transferred to IL mode, the addresses of the lines involved are stored in the IL memory, on an IL channel basis for the 16 IL channels.

In the remote terminal, a normal memory stores addresses of lines associated with channels involved in a call and two memories for storage of addresses of lines associated with intra link channels, both originating and terminating.

By referring to these memories, addresses may be transferred under the control of the status information found and stored in the IL control memory.

An originating call marker comprised of a five flip flop latch register 760 feeding exclusive OR gates 762 and a six input NAND gate 764 is provided in the detector circuit 80, the register being marked on an originating call to provide the one-at-a-time check of lines originating calls.

PROCESSING OF AN IL CALL

A call originating in the system is started in the usual manner by a station going off-hook. The call is processed through the remote terminal to which the calling station is connected and an indication of this call is noted by the central office during the signalling channel periods.

A channel is then assigned to the call and the status of the call is stored in two locations. The first location is an 8×32 bit memory 834 in the time division switch memory 34 (FIG. 8) which monitors the use of the channel assigned to handle the call. The second storage location is within a 4×32 channel status memory 110 in the intra link control unit in the CO. One bit of the memory 110 for a channel is marked when an off-hook station is found and assigned to have the call processed through a specific channel. This action begins a timing cycle of one to two minutes duration during which an intra link transfer must take place. If no intra link transfer occurs within the timing interval, it is assumed that intra link ceases for that channel and bit No. 4 of the channel status memory is so marked.

The call is processed in the normal manner as set forth in the copending application noted, by the CO with the originating station dialing the called or terminating station and the call being completed to the called station. It will be assumed that the called station is at the same remote terminal and is therefore eligible to be connected to the originating station over the intra link network.

The terminating station receives ring signals from the CO over a second channel of the available speech channels. When the terminating station responds by going off hook, two channels are in use for the call. Where both stations at the same remote terminal are involved, it of course would be advantageous to eliminate the use of speech channels to the CO and transfer the call to a local path requiring only signalling channels to the CO for control purposes.

The fact that the first local station is an originating station has been stored on the channel status memory 110 for its channel and the fact that the second local station is a terminating one is sensed and marked in the channel status memory for its channel as mentioned previously. The off-hook condition coupled with called direction of the call on the second channel is received by the IL control logic terminating call control 112 (FIG. 2).

Within the IL memory 82, latch register 132 is activated to mark the terminating station address. The terminating call marker 114 is activated to mark the terminating station channel. This register 114 sends a command to the IL detector (FIG. 4) to enable circuits of the timing interface 163 to mark a channel on the receive timing circuit 42 at the CO. This channel marking also activated ID tone generator 162 to produce a digitally generated ID code to be inserted into the terminating channel at the channel at the CO receive timing circuit 42 (FIG. 1A). The digital code signal is routed to the line associated with the terminating channel. The code signal digits are decoded at the line demodulator to become a tone of approximately 3 KHz which is sent to the caled line.

The tone passes through the CO switching equipment and passes through to the line unit of the originating station where the tone is digitized to pass through the transmit timing circuit in digital form to the IL detector 80. It should be noted that when the terminating station goes off-hook, an ID tone delay (of up to one second duration) within the terminating call control 112 is activated. This delay prevents transmission of ID tone for a period long enough to allow the CO switching equipment to complete its functioning and produce a stable speech path. The end of the delay initiates the transmission of the ID tone.

If a number of stations at a terminal have originated calls, each must be examined in turn until the originating call and terminating call are matched with the code signal sent out on the lines. This check is made at the originating call market 166 within the IL detector in which each eligible originating station channel is marked one at a time. An eligible originating station is defined as one indicated in the channel status memory 110 as having originated a call (bit No. 1 unmarked indicating that the station was not rung, bit No. 2 marked as off-hook, and bit No. 4 unmarked as signifying that the channel used has not been declared ineligible for an IL call). Each originating station meeting these criteria and having the remote terminal shelf identifying three digits in its address code as determined by link group assignment switches 144, is checked in sequence.

The process of examining the channels for a tone is performed by the ID tone detector 80 which is coupled to receive signals from the transmit timing circuit. The detection of the code is enabled over a path to the ID tone detector from the terminating station call control 112 over lead detector enable (ZDE), through ID control 160 to the ID detector 164. The detector includes two commutating filters connected in parallel, each being tuned to another frequency. These filters check sequentially during the proper channel time period as clocked by flip flop 710 in FIG. 7, the flip flop having received its timing on lead ZBBT. The filters check for the presence of one specific frequency and for the absence of the other frequency. Each such filter has at its output an amplifier and a detector circuit.

An examination sequence which successfully determines eligibility of both stations for intra link call completion includes the following four steps: (1) Sending of a first frequency; (2) Detecting the first frequency and the absence of a second frequency; (3) Sending a second frequency, and (4) Detecting the second frequency and the absence of the first frequency.

In the circuit of FIG. 7, there is shown a manually settable switch 701 with three positions. Each position provides a different combination of first and second frequencies. For example, one set of combinations, found acceptable is as follows: For position No. 1 on the switch 701, F1 is 2757 Hz and F2 is 3153 Hz; for position No. 2, F1 = 2941 Hz and F2 is 3153 Hz; and for position 3, F1 is 2941 Hz and F2 is 2757 Hz. Of course, other combinations may be used in place of these exemplary ones, the present tones having been chosen because of convenience and to minimize interaction between signalling tones used for other purposes.

The four steps noted above for sending and receiving the two frequencies are sensed by call validator 165 of the detector. The duration of the examination period for each tone is determined by a frequency shift potentiometer 790 within the timing circuit contained in the ID control 160 and shown in FIG. 7.

On completion of a successful examination sequence, the verifying circuit or call validator 165 provides a transfer command to the call transfer circuit 117 of the IL control. This command is passed through channel organizer 152 to memories 134 and 136 to cause a transfer in memory bit 4 (channel status memories) of the originating and terminating channels, since the call has been disposed of for intra link purposes by this action.

The line addresses from locations in the IL memories 134 and 136 are sent through the output gates 156 to the TDS memory 34 (FIG. 1).

These memories 134 and 136 contain 8×16 bits (an eight bit address for each available intra link channel). The transfer command produces a write signal in each of the IL memories 134 and 136 for the first available channel, the addresses having been received from the TDS memories and stored in latch registers 130 and 132. If no IL channel is available as evidenced by all 16 memory locations in the 8×16 IL memories 134 and 136 having an IL control bit marking the channel as active or assigned, the IL demand status unit 150 in the IL memory will not notify the TDS control 36 via lead ZLBS to cancel the demand for normal channels that were assigned to the calls. No call transfer can occur, and the call is maintained in the normal manner.

Where an IL channel is available, the write command placed by the channel organizer 152, causes the contents of the originating IL latch register 130 and the terminating latch register 132 to be loaded in the selected IL channel in respective memories 134 and 136. These latch registers had been loaded from the outputs of the 8×32 channel address memory located within the TDS memory 34, at the same time as the originating and terminating markers 166 and 114 of the control circuits, thus the registers contain the addresses placed in the marked channels.

The outputs of the originating and terminating address memories 134 and 136 are gated through output gates 156 and are forwarded through the parallel to a series shift register located within the TDS memory circuit 34. This shift register transmits commands to the remote terminals causing the routing of calls from the normal to the intra link mode within the remote TDS circuit of FIG. 8.

The IL control bit (discussed previously as providing an IL channel busy indication) is also used by the IL demand status circuit 150, to generate a signal causing the TDS control to cancel channel demand caused by the off-hook condition of lines in the intra link mode. By cancelling the channel demands, the normal speech channels originally used by the stations in establishing the IL call may be released. It should be noted that this off-hook signalling had been transmitted over a signalling channel from the remote terminal and did not use a speech channel.

The intra link call once transferred uses intra link intervals within the channel timing, as shown by FIG. 9. Viewing FIG. 9, it can be seen that each channel time interval has a transmit sub-interval and a receive half-interval. Since transmit and receive each use separate lines, alternate sub-intervals are available on each line. These are used in the manner shown in FIG. 9. These intra link channel intervals are linked at the remote terminal within the 16×8 originate and terminate call memories at the remote terminal while control of the call is maintained in the CO by the IL memory.

When a station involved in a intra link call goes on hook, an indication of this condition change is reported to the TDS control through the signalling channels. This information is fed on the call status lead to call release circuit 140. This data along with IL demand status information causes a write pulse to be generated for the IL channel in the memories 134 and 136. The control bit for that IL channel reverts to its unmarked state. The change of control bit is fed through output gates 156 and is fed to the remote TDS memory causing the intra link connection to be released.

The cancellation of the channel demand within the TDS control is removed causing the line still off-hook to demand and be assigned a normal VF channel until the line goes on hook.

The link group assignment switches 144 in FIG. 3 are shown in FIG. 6 as comprising four groupings of eight switches to program a link group of four links to a maximum of four remote terminals. The lines themselves are assigned to remote terminals in groups of sixteen, each group comprising one shelf. The shelves may be assigned to terminals in any desired order, as determined by the interconnection between shelves and a remote TDS circuit at a remote terminal. The link group assignment switches allows the shelves to be assigned to link groups in any sequence. Each link group has an LED to indicate if all links in the group have been assigned.

The call classifier 146 of FIG. 3 comprises a gating and latch network to interconnect the four link groups wit the link group assignment switch outputs. By this gating network, the classifier examines the association between the order of the switches, as programmed, and the traffic conditions. When a terminating call occurs, the shelf address (1–8) is noted and compared with the switch settings to see if that shelf is assigned to a specific link group. If there is no such assignment, bit No. 4 of the 4×32 channel status memory is marked making that channel of the terminating call ineligible for intra link usage. Bit No. 4 for a channel is also marked busy if the shelf is assigned to a link group in which all links are busy.

If the terminating call is made to a shelf while a previously occurring terminating call is being examined, bit No. 3 of the 4×32 channel status memory will be marked busy for the latter call. This condition will place the call on standby until the previous call has been examined. At this time, the status of bit No. 3 will revert to its unmarked state allowing the call to be examined.

It should also be noted that when an eligible terminating call is noted, and no local originating calls are present, the absence of local originating calls is indicated to mark bit No. 4 of the 4×32 channel status memory to prevent intra link checking from occurring.

In this way, a system having a large number of available intra link channels may be provided, to enhance the call-carrying capability of the system.

I claim:

1. A telephone subscriber multiplexing concentrator system comprising: a central office, a plurality of remote terminals coupled to said office via a multiple-channel digital network, and a plurality of subscriber lines connected to each terminal; the channels of said network being divided into signalling channels, digital data channels and intra link channels, means for signalling calls over said signalling channels, to enable digital data channels for the completion of a call from a calling line to a called line via remote terminals, and means employing said digital data channels for transferring a call between a called line at one of said remote terminals and a calling line at said one remote terminal from the enabled data channels to intra link channels for continuation of said call over said last mentioned intra link channels internally at said one remote terminal as an intra link call, and in which there are memories for storing line identification information at said one remote terminal for lines in an intra link call and memories at the central office accessed over said signalling channels for storing identifying data regarding lines for controlling the intra link call.

2. A concentrator system as claimed in claim 1, wherein said channels are positioned within recurring time frames with said signalling channels at an end of each frame, and said data and intra link channels interspersed throughout each frame with supervisory control of a call continued using said intra link channels maintained over said signalling channels.

3. A concentrator system as claimed in claim 1, wherein said central office memories include a first memory for calls using digital data channels and a second memory for calls using intra link channels.

4. A concentrator system as claimed in claim 3, wherein said first and second memories contain storage for addresses of lines involved in said calls, and in which there is a third memory in said central office for storing the status of lines using said digital data channels.

5. A concentrator system as claimed in claim 4, wherein each remote terminal has memories identical to said first and third memories.

6. A telephone subscriber multiplexing network for coupling a plurality of subscriber lines to a central office by way of a remote terminal coupled to said lines with the coupling from said remote terminal to said office being completed via a plurality of multiple channel unidirectional paths, said paths being a transmit path and a receive path, memory means at said central office for storing the calling and called condition of each of the lines using said channels, temporary storage means for storing the condition of a line using a channel for a transfer determination, means responsive to the storage of a predetermined condition of one of said lines in said temporary storage for initiating the transmission of digitized tones over a channel to a line coupled to said one line over said channels, means responsive to the failure of receipt of said tones by other ones of said lines using said channels for storing an indication of said failure for said one line in said memory means and for erasing the condition of said one line from said temporary memory.

7. A network as claimed in claim 6, wherein there is timing means initiated coincidentally with the initiation of the transmission of tones, said timing means operative to time a period for the receipt of one of said tones, and means for indicating a failure of receipt of said one tone by the end of said period for marking said failure in said condition storing means.

8. A network as claimed in claim 6, wherein there are means for sequentially transmitting tones over channels to other lines indicated by said condition storage means as being in an off-hook condition.

* * * * *